United States Patent [19]

Dix et al.

[11] Patent Number: 4,521,884
[45] Date of Patent: Jun. 4, 1985

[54] METHOD AND APPARATUS FOR ERROR DATA FEEDBACK IN A DISKETTE DRIVE

[75] Inventors: Gary L. Dix, Rochester; Lloyd S. Heim, Oronoco, both of Minn.; Robert F. Herald, Longmont; William P. Quinlan, Boulder, both of Colo.

[73] Assignee: International Business Machines Corporation, Armonk, N.Y.

[21] Appl. No.: 439,956

[22] Filed: Nov. 8, 1982

[51] Int. Cl.³ .............................................. G06F 11/00
[52] U.S. Cl. ...................................... 371/15; 364/900
[58] Field of Search .................... 364/200, 900; 371/15

[56] References Cited

U.S. PATENT DOCUMENTS

| | | | |
|---|---|---|---|
| 4,101,969 | 7/1978 | Lawson et al. | 364/900 |
| 4,322,813 | 3/1982 | Howard et al. | 364/900 |
| 4,410,942 | 10/1983 | Milligan et al. | 364/200 |
| 4,435,762 | 3/1984 | Milligan et al. | 364/200 |
| 4,443,849 | 4/1984 | Ohwada | 364/200 |

OTHER PUBLICATIONS

IBM Technical Disclosure Bulletin, vol. 23, No. 6, Nov. 1980, entitled "Electronic Interface for Magnetic Disk Machine", by D. L. Lochner.

*Primary Examiner*—Jerry Smith
*Assistant Examiner*—Michael R. Fleming
*Attorney, Agent, or Firm*—Homer L. Knearl; Carl M. Wright

[57] ABSTRACT

Error information is passed across a limited interface from a disk drive to its using system by making use of the read data line during a fault mode operation. Fault mode operation is detected by a pulse width detector in an adapter between the using system and the disk drive. The pulse width detector detects the presence of a fault signal on the read data line and inhibits the passage of the spindle motor on (MTR ON) signal from the using system to the disk drive. The step signal normally used to index the recording head is passed to the disk drive during fault mode operation. A microcomputer at the disk drive detects the absence of the MTR ON signal and the presence of the step signal and outputs a fault data bit. Thereafter, the fault data word is gated onto the read data line at the rate of one bit per step of the step signal so long as the MTR ON signal is absent.

17 Claims, 3 Drawing Figures

FAULT MODE ROUTINE

4,521,884

METHOD AND APPARATUS FOR ERROR DATA FEEDBACK IN A DISKETTE DRIVE

FIELD OF THE INVENTION

This invention relates to a disk recording drive having a limited interface between the drive and its adapter. The interface contains only signal lines relating to motor control and data. In particular this invention relates to recovering drive fault information across this limited interface.

BACKGROUND OF THE INVENTION

In interchangeable floppy-disk, recording devices, often referred to as diskette drives, there has been very little electronics built into the drive. Typically, the disk motor has been a DC motor driven at constant speed, and the recording head has been indexed to different tracks on the disk by a stepping motor. The interface between the drive and drive adapter has contained few signal lines, for example disk motor on/off, steps for the stepping motor control, read data and write data.

In the past if the drive failed, the drive usually interrupted the using system by just shutting down. However, in some systems a drive might not shut down because of the type of failure. In this event, more severe results could occur such as loss of data caused by overwriting, erasure or failure to read. To date there has been no way for the using system to know the cause of the failure and thus no way to attempt recovery.

With the advent of microprocessors, electronics in the diskette drives can offer more function. It is now possible to use a microprocessor in the drive to perform such functions as spindle motor control to control the speed of the disk, stepper motor control for more precise indexing of the recording head and fault detection of functions in the drive including diagnostic routines.

With computing power available on the drive, the interface between the drive and its adapter or using system could be made more sophisticated to take advantage of this computing power. However, for sake of compatibility with prior designs it is desirable to leave the interface unchanged. Also, to keep the cost of the drive low it is desirable to minimize the number of signal lines and associated buffers and gates between the drive and its adapter. Accordingly, the problem becomes how to take advantage of the computing power on the diskette drive and thus additional control and error information that might be available from the drive without changing the interface between the drive and its adapter or between the adapter and its using system.

SUMMARY OF THE INVENTION

This invention has solved the above problems by having the drive and the adapter switch to a fault mode of operation in which the motor control lines are used to control the sending of error data from the drive to the adapter and the using system. In the fault mode of operation the read data lines are used to carry the error information.

When the microprocessor in the drive wishes to interrupt the using system with error information, the data signal on the read data line is replaced with a fault signal. The adapter then drops the Motor On command line that goes to the spindle motor in the drive. At the same time the system continues to send stepping motor step pulses normally used to advance the stepping motor.

At the drive, when the Motor On signal drops, the step pulses are used as shift pulses to shift fault or error data out of a register in the drive microprocessor. The register in the drive microprocessor contains the error information the drive microprocessor wishes to pass back to the using system. Thus, when the drive wishes to communicate with the using system, the step pulses become shift pulses and the read data line is used to carry the error or control information.

The significant advantage of this invention is that now the computing power in the diskette drive may be more fully used by enabling error information to be passed from the drive to the using system while at the same time the interfaces between the using system, the adapter and the drive are unchanged. By not changing the interfaces, the cost of the drive is held down, and the drive is still compatible with prior interface designs.

BRIEF DESCRIPTION OF DRAWINGS

The invention is described in detail below with reference to drawings, illustrating specific embodiments of the invention, in which.

DETAILED DESCRIPTION

Figure 1:
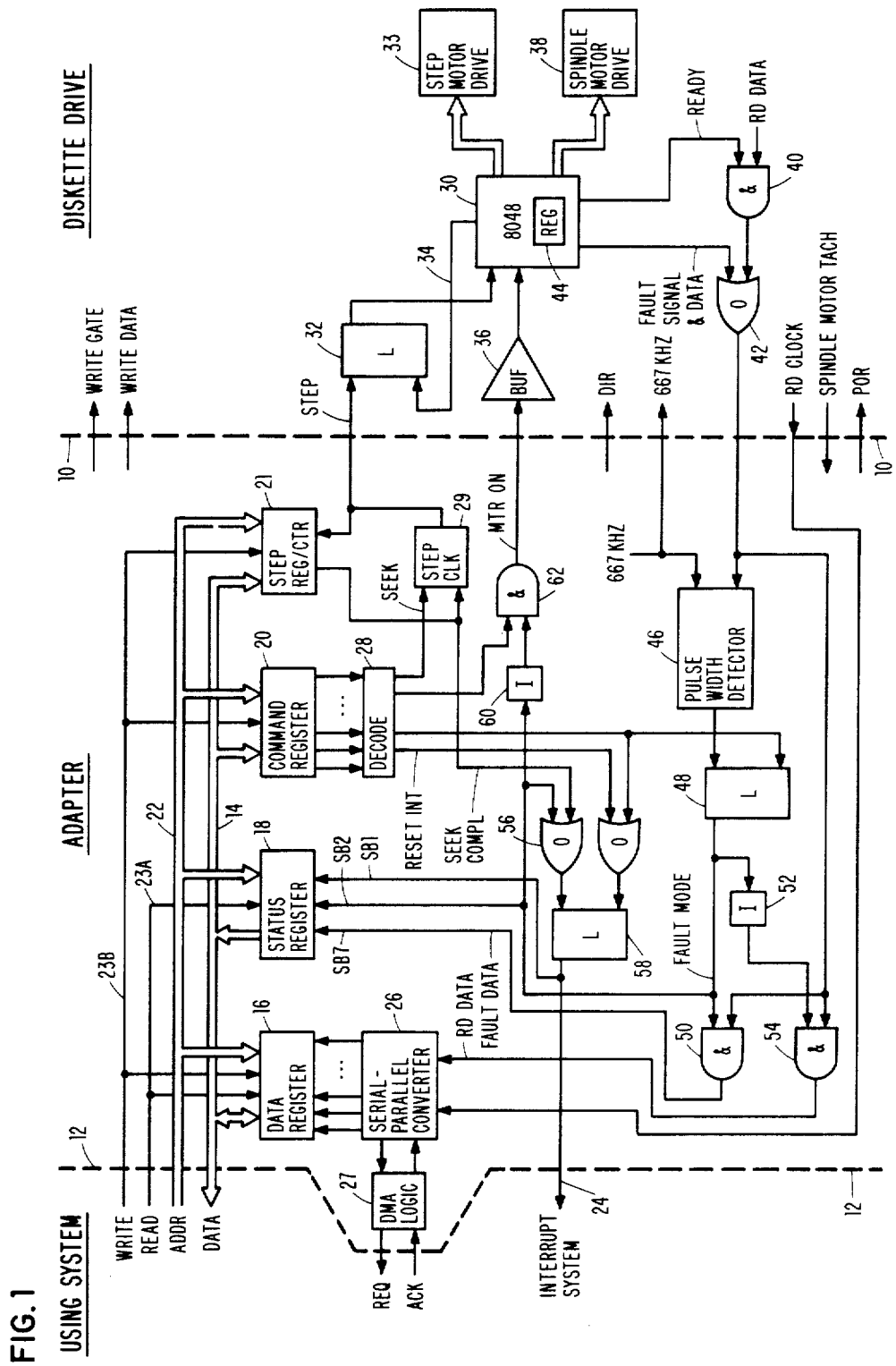
FIG. 1 shows the electronics for a diskette drive and its adapter card to the extent those electronics relate to feeding back error or fault data from the drive to the using system.

Referring now to the preferred embodiment of the invention in FIG. 1, a portion of the electronics to implement the invention are located on the diskette drive and the remaining portion is located on the adapter circuit card. The interface between the diskette drive and the adapter circuit card is represented by the dashed line 10. There are ten signal lines across interface 10. All of the signal lines are shown, although only three of the lines, step, motor on, and read-data/fault-data, are used by the invention.

The interface between the using system and the adapter electronics card is represented by dashed lines 12. The signal lines shown across interface 12 are those signal lines necessary to understand the invention; other lines across the interface are not shown.

Data bus 14 carries data to and from data register 16, status information from status register 18, command information to command register 20 and recording head indexing information to step register/counter 21. Address bus 22 controls which of the registers 16, 18, 20 or 21 is being addressed by the using system. Read and write control lines 23A and 23B, respectively, from the using system control the reading and writing of information into or out of the registers.

The interrupt system signal over line 24 is an interrupt flag to the using system. It indicates either that an operation has been completed by the adapter or the diskette drive or that there is a fault in the drive.

Data register 16 in the adapter electronics is a buffer register for read data from the drive or for write data to the drive. Only the read data connection to the diskette drive is shown as that is the only portion relevant to the present invention. The read data signal from the drive is serial in form and is converted to an 8 bit word by serial to parallel converter 26. The clock signal used by the converter 26 to do the conversion is the read clock signal derived from the recorded data signal by a phase lock loop (not shown) in the diskette drive.

Status register 18 contains eight status bits of which only status bits 1, 2, and 7 (SB1, SB2, and SB7) are of interest to the invention. SB1 is a flag back to the using system that the present device is the diskette drive that has generated the interrupt. SB2 is a flag back to the using system that the interrupt was caused by a fault detected in the diskette drive. SB7 is the fault or error data and is passed back to the using system bit by bit as will be explained hereinafter.

Command register 20 buffers commands from the using system and decoder 28 decodes the commands for use by the adapter and the diskette drive. Commands relevant to the present invention are seek, device reset and reset interrupt.

The seek command is decoded by decoder 28 to indicate the direction the recording head is to be moved and also to enable the step clock 29 that generates the actual step pulses passed to the drive. The logic to generate the direction signal passed from the adapter to the drive is not shown as it is not relevant to the invention. The step pulses from clock 29 are also used within the adapter to decrement the step count loaded into the step register/counter 21 by the using system.

The seek command is also decoded in decoder 28 to generate a motor on (MTR ON) signal. The MTR ON signal is used to turn the spindle motor (disk motor) on and off. To prevent the recording head from scratching the recording disk, the MTR ON signal always goes active with the seek signal. Accordingly, the recording disk will always be moving when the recording head is moved across the disk.

The device reset and reset interrupt commands decoded by decoder 28 are used by the adapter. Device reset is a more general reset command and would be used to reset all logic in the device to which it was sent. In the present invention, it is used to reset the interrupt signal and to reset the device from the fault mode. The reset interrupt is a limited reset signal and is only used to reset the interrupt system signal.

The step register/counter 21 buffers the step count sent from the using system to the drive for the purpose of indexing the recording head. For each indexing operation, the using system sends a count to register/counter 21 equal to the number of steps the recording head is to be moved. After this count is read into register 21, the using system sends the seek command to command register 20 to start the indexing operation.

As described above, the seek command when decoded, causes step clock 29 to emit the step pulses passed across the interface to the drive. Each step pulse also decrements the step count in register/counter 21. When the step count in register 21 reaches zero, the register emits the seek complete signal that inhibits step clock 29 and sets the interrupt system latch 58. The interrupt system signal coming up signals the using system that the adapter has finished the seek operation.

Referring now to the diskette drive in FIG. 1, an 8048 microcomputer 30 is used to control the drive. The step commands from the adapter are buffered through latch 32 before they are applied to the computer 30. When the computer has processed the step command from the latch 32, it generates a signal on line 34 to reset the step latch 32.

The motor on (MTR ON) signal from the adapter is passed through a buffer amplifier 36 to microcomputer 30. Computer 30 utilizes the motor on signal being active or present to activate the spindle motor drive 38.

Read Data (RD Data) is gated out of the diskette drive from a read/write channel (not shown) by the ready signal generated by computer 30. The ready signal being present enables AND gate 40 to pass the read data through OR 42 to the adapter.

In the event that a diagnostic routine performed by computer 30 in the drive detects a fault or in the event a fault arises during operation, computer 30 drops the ready signal. AND gate 40 is then inhibited and read data is not passed to the adapter.

When computer 30 detects a fault and drops the ready signal to block read data, it also gates out a fault signal from the computer. This fault signal being present is the signal used by the adapter to detect the beginning of fault mode operation.

Referring to the adapter in FIG. 1, the detection of fault mode is accomplished by the pulse width detector 46. Pulse width detector 46 receives a clock signal, used by the adapter and the diskette drive, having a frequency of 667 KHz. A clock signal of this frequency has a period equal to 1500 nanoseconds. Normal pulse width for read data varies between 300 and 900 nanoseconds, whereas the duration of the initial fault signal at one signal level is greater than 1500 nanoseconds. Therefore, when the fault signal is received via OR 42 in the diskette drive, the pulse width detector 46 will detect the fault condition because the signal's duration is greater than 1500 nanoseconds.

When the pulse width detector 46 detects the fault signal, it generates an output signal that sets the fault mode latch 48. The fault mode latch output is used to gate fault or error data to status register 18, to generate the interrupt system signal at latch 58 and to inhibit AND gate 62 to prevent the motor on signal from being sent to the diskette drive.

The fault mode signal enables AND gate 50 and after being inverted by inverter 52, inhibits AND gate 54. AND gate 54 normally passes the read data to the serial-to-parallel converter 26. AND gate 50 passes fault data to status bit 7 of the status register 18. Thus, in fault mode, AND gate 50 is active; otherwise, AND gate 54 is enabled.

The fault mode signal also is applied to status bit 2 (SB2) in the status register. This is a flag to the using system that the interrupt is due to a fault in the diskette drive. Fault mode also is passed by OR 56 to set the interrupt latch 58. The interrupt latch is the source of the interrupt system signal on line 24 passed back to the using system.

Finally, the fault mode signal via inverter 60 inhibits AND gate 62 from passing the motor on signal from decoder 28 to the diskette drive. Microcomputer 30 in the diskette drive interprets the absence of the motor on signal in combination with the presence of a step signal as a signal from the using system to gate out the first fault or error data bit from register 44 in the computer. Accordingly, in fault mode, the step signals received from the adapter by the diskette drive are used to shift out the successive bits making up the fault data stored at register 44 in computer 30.

Figure 2:
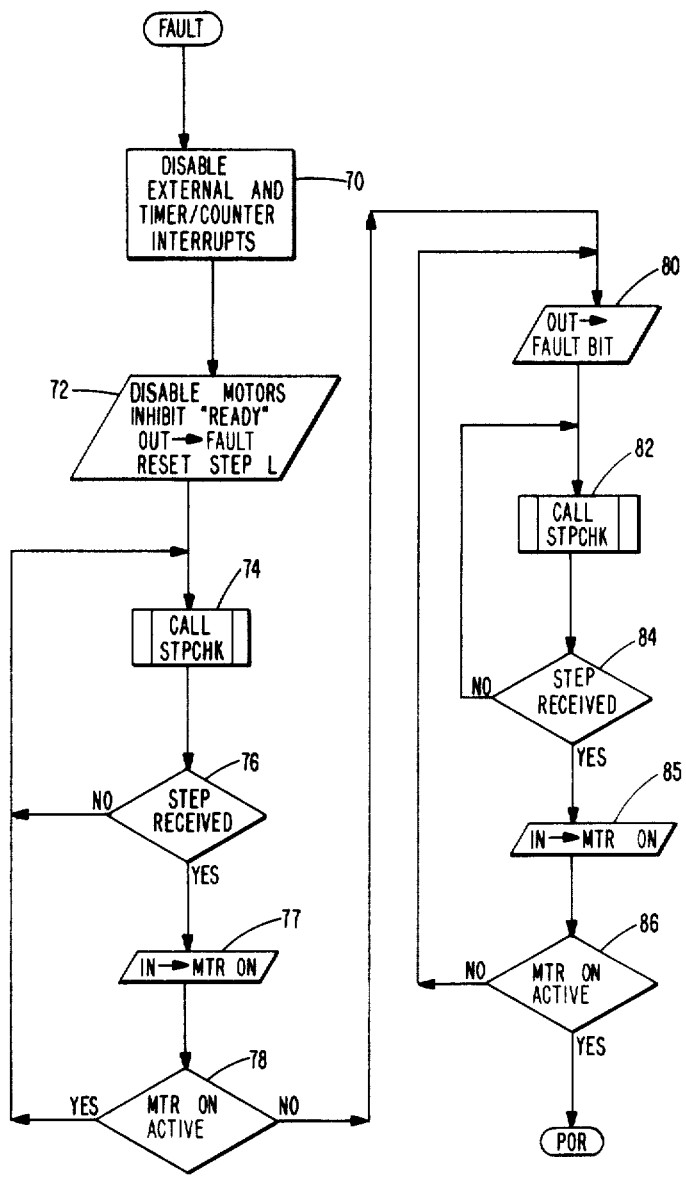
FIG. 2 shows the fault mode program routine that controls microcomputer 30 in FIG. 1 during fault mode operation.

Referring now to FIG. 2, the functions performed by the 8048 microcomputer 30 in FIG. 1 during fault mode operation are shown in the program flowchart. When the diskette drive has failed or diagnostic routines used by the computer have detected a fault in the diskette drive, the fault routine is entered.

At functional block 70 in the fault routine, computer 30 disables the external and timer/counter interrupts that normally trigger the action and response cycles of microcomputer 30. After the interrupts have been disabled, microcomputer 30 proceeds via functional block 72 to prepare the drive for the fault mode.

During function 72, the computer generates signals on its output ports that disable the step motor drive 33 (FIG. 1) and the spindle motor drive 38 (FIG. 1). Also, during block 72 operation, the fault mode routine outputs the fault signal to OR 42 (FIG. 1) as previously described. Finally, function 72 in the routine resets the step latch 32 (FIG. 1). The result of the output functions performed by microcomputer 30 and represented by block 72 is to set up the diskette drive for fault mode operation and to signal fault mode to the adapter by means of the fault signal.

Figure 3:
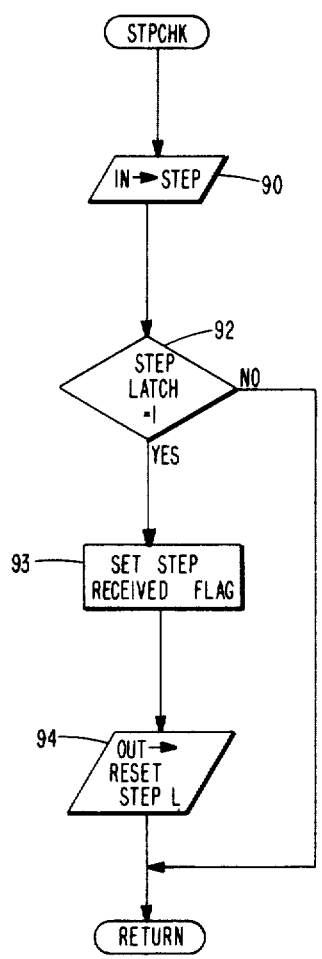
FIG. 3 shows the step check subroutine used in the fault mode routine of FIG. 2.

Microcomputer 30 then calls the step check (STPCHK) routine which is shown in detail in FIG. 3. The step check routine at input funtion 90 checks an input port for the step signal from step latch 32. If the step signal is not present, the step check routine returns control to the routine that called it. If the step signal is present then program flow proceeds through decision block 92 to function 93 that sets a step received (STEP RECVD) flag. Next computer 30 at output function 94 emits the signal to reset step latch 32. After function 94 program flow returns to the routine that called step check.

From the step check routine 74, the fault mode routine goes to decision block 76 where it checks to see whether a step was received as flagged by the step check routine 74. If it was not, then the program loops back to the step check routine 74. If the step signal was received, the program branches to input function 77.

Function 77 looks at the MTR ON input port for the motor on signal. Decision 78 controls the program flow direction depending upon whether the motor on signal is active. If a motor on signal has been received, the fault mode has not been set in the adapter and the program loops back to the step check routine 74 to look for the next step signal. If the motor on signal is not present, which is the normal sequence for fault mode, then the program branches to output function 80.

In output function 80, microcomputer 30 shifts the first fault bit out of the computer to OR 42 and on to the adapter. As described earlier, this fault bit is passed by AND 50 in the adapter to status bit 7 of status register 18. From the status register 18, the fault bit goes to the using system. The using system, when it detects the fault bit, generates another step command.

After the fault routine outputs the fault bit, the routine proceeds to call step check as represented by a function 82. Step check again checks the appropriate input port for the step signal, sets the step received flag and resets the step latch if the step signal is received. From step check 82, the fault mode routine proceeds to decision 84 where it checks for the step received flag. If a step was not received, program flow branches back to the step check routine 82. If it was received, program flow proceeds to input function 85 where microcomputer 30 checks for the motor on signal. If motor on was not received, computer 30 knows that the step represents a command to shift another fault bit out of the computer so decision 86 directs the program flow back to output function 80. At function 80, the next fault bit is shifted from computer 30 to OR 42 for passage to the adapter.

During decision function 86, if the microcomputer 30 detects a motor on signal present, the fault mode routine is exited to a normal power on reset (POR) supervisory program in microprocessor 30. The reception of a motor on signal at this point in the routine would indicate that the fault mode operation has finished and the fault mode latch 48 in FIG. 1 has been reset by a device reset command from the using system.

While the software routines used to control the microcomputer 30 during operation of the invention have been described relative to the flowcharts in FIGS. 2 and 3, the implementation in Assembler language for the INTEL 8048 microcomputer follow immediately hereafter. The first line of code for portions of the program listing corresponding to the functional blocks in FIGS. 2 and 3 have been identified with the same reference numerals used in FIGS. 2 and 3.

| | FAULT MODE ROUTINE | | | |
|---|---|---|---|---|
| | REF | CODE | | ;COMMENT |
| 70 | ERROR: | DIS | TCNTI | ;TIMER INTERRUPT NOT ALLOWED |
| | | DIS | I | ;EXTERNAL INTERRUPT NOT ALLOWED |
| | | CLR | F0 | ;RESET STEP RECVD FLAG |
| | 72 | ANL | P1,#(NB2 AND NB4 AND NB6 AND NB7) | |
| | | | | ;TURN OFF STEPPER, SPINDLE, AND |
| | | | | ; READY, RESET STEP LATCH |
| | | ORL | P1,#TB5 | ;ACTIVATE FAULT SIGNAL |
| | | ORL | P1,#TB7 | ;REMOVE RESET FROM STEP LATCH |
| 74 | ERRWT1: | CALL | STPCHK | ;HAS A STEP COMMAND BEEN RECEIVED? |
| 76 | | JF0 | MOCHK | ;IF SO, JUMP TO MOCHK |
| | | JMP | ERRWT1 | ;IF NOT, JUMP TO ERRWT1 |
| 77 | MOCHK: | IN | A,P2 | ;CHECK "MTR ON" ACTIVE |
| | | CLR | F0 | ;RESET STEP RECVD FLAG |
| | | CPL | A | ;COMPLEMENT A |
| 78 | | JB0 | ERRWT1 | ;IF "MTR ON" ACTIVE, JUMP TO |
| | | | | ; ERRWT1, OTHERWISE GO TO ERRBIT |
| 80 | ERRBIT: | MOV | A,R0 | ;FETCH ERROR CODE |
| | | JB7 | ONE | ;IF MOST SIGNIFICANT |
| | | | | ; BIT = 1, JUMP TO ONE |
| | | ANL | P1,#NB5 | ;OUTPUT 0 |
| | | JMP | ROTATE | ;JUMP TO ROTATE |
| | ONE: | ORL | P1,#TB5 | ;OUTPUT 1 |
| | ROTATE: | RL | A | ;NEXT MOST SIGNIFICANT BIT IS NEXT |
| | | | | ; OUT |
| | | MOV | R0,A | ;SAVE BITS |
| 82 | ERRWT2: | CALL | STPCHK | ;HAS ANOTHER STEP COMMAND BEEN |

-continued

|    |         |     |         | ; RECEIVED?                              |
|----|---------|-----|---------|------------------------------------------|
| 84 |         | JF0 | ENDCHK  | ;IF SO, JUMP TO ENDCHK                   |
|    |         | JMP | ERRWT2  | ;IF NOT, JUMP TO ERRWT2                  |
| 85 | ENDCHK: | IN  | A,P2    | ;CHECK "MTR ON" ACTIVE                   |
|    |         | CLR | F0      | ;RESET STEP RECVD FLAG                   |
| 86 |         | JB0 | ERRBIT  | ;IF "MTR ON" INACTIVE, ; JUMP TO ERRBIT  |
|    |         | JMP | POR     | ;IF ACTIVE, RESET DRIVE                  |

| STEP CHECK ROUTINE |||||
|----|---------|-----|---------|------------------------------------------|
| 90 | STPCHK: | IN  | A,P2    | ;IS A STEP COMMAND LATCHED?              |
| 92 |         | JB3 | STEP    | ;IF SO, JUMP TO STEP                     |
|    |         | RET |         | ;IF NOT, RETURN                          |
| 93 | STEP:   | CPL | F0      | ;COMPLEMENT A, STEP HAS ; BEEN RECEIVED  |
| 94 | RSTSL:  | ANL | P1,#NB7 | ;RESET STEP LATCH                        |
|    |         | ORL | P1,#TB7 |                                          |
|    |         | RET |         | ;RETURN                                  |

OPERATION

When the diskette drive is operating normally and read data is being passed back to the using system, microcomputer 30 generates the ready signal that enables AND gate 40. The read data then passes through AND gate 40 and OR 42 in the diskette drive and through AND gate 54 to the serial-to-parallel converter 26 in the adapter.

When converter 26 has an 8 bit data word ready for register 16, it passes it to the register. At the same time the DMA (Direct Memory Access) logic 27 in the adapter sends a request signal across the interface to the DMA controller in the using system. When the DMA controller can steal a cycle from the processor in the using system, it reads the eight bit word in data register 16 into the using system. Then the DMA controller sends an acknowledge signal back to the DMA logic 27 so that the logic will enable converter 26 to load the next data word into register 16.

Fault mode operation begins when the microcomputer 30 in the diskette drive detects a failure in the functioning of the drive or the diagnostic routine performed at power on reset indicates a fault. If there is a failure in the drive, the diagnostic routines will automatically be initiated. As a result of the diagnostic routines, an eight bit fault or error data word will be stored in register 44 in microcomputer 30. The microcomputer shuts off its external and timer/counter interrupts and then outputs signals used to enter the fault mode. These output signals stop the stepper motor drive, stop spindle motor drive, inhibit the ready signal to AND gate 40, reset the step latch 32 and output the fault signal to OR 42.

At the adapter when the first fault signal is received, its duration is sufficient to trigger an output from the pulse width detector 46. Pulse width detector 46 then sets latch 48 to indicate the fault mode operation to the adapter.

In fault mode operation at the adapter, AND gate 50 is enabled and passes the first fault signal to status bit 7 of the status register. The fault mode signal from latch 48 also sets the interrupt system latch 58 via OR 56. The interrupt system signal is stored as status bit 1 (SB1) in status register 18.

In addition to setting interrupt system latch 58, the fault mode signal also sets status bit SB2 in the status register and inhibits AND gate 62 via inverter 60 from passing motor on signals to microcomputer 30 in the diskette drive. SB2 in the status register is an indication back to the using system that the interrupt is caused by a fault at the diskette drive.

When the using system receives the interrupt system signal over line 24, it will scan the status registers in its peripheral devices looking for the device that generated the interrupt. As a result of addressing status register 18, the using system detects that SB1 is set, indicating the interrupt came from this peripheral device, and that SB2 is set indicating that a fault has occurred in the diskette drive.

Knowing that the diskette drive and adapter are in the fault mode, the using system loads a reset interrupt command into command register 20. The reset interrupt command resets latch 58 and the interrupt system signal drops. Then the using system loads a step count of one into step register/counter 21 and loads a seek command into command register 20.

Decode 28 decodes the seek command and enables the step clock 29. The clock pulse out of step clock 29 is the step signal that sets latch 32 in the diskette drive. In addition, this pulse counts down the step register/counter 21. Since the loaded count in register/counter 21 is one, register 21 is counted down to zero, and step clock 29 is inhibited.

Zero count in register 21 as previously described is the seek complete signal. The seek complete signal in addition to inhibiting step clock 29, also sets latch 58 through OR 56. Accordingly, an interrupt system signal goes back to the using system over line 24 telling the system that the adapter has completed the seek or stepping operation.

In the diskette drive, microcomputer 30 is now receiving a step signal from step latch 32 without the presence of a motor on signal (AND gate 62 is inhibited). This combination of conditions indicates the adapter is in the fault mode.

Since the microcomputer is in the fault mode routine operation, the detection of the step signal and the not-active MTR ON signal causes the computer to output the first fault bit to OR 42. From OR 42, the fault bit passes through AND gate 50 enabled by the fault mode latch 48 to status bit 7 (SB7) of the status register 18.

The using system having been interrupted by the interrupt system signal on line 24 will generate a reset interrupt command to reset latch 58. Then the using system addresses status register 18 and reads the contents of the register. In this case it is reading the register to pick out the fault bit at status bit 7. When the fault bit has been read from status bit 7 position, the using system loads a step count of one into register/counter 21 and loads a seek command into command register 20. The adapter and diskette drive are now prepared to read out the next fault bit from the microcomputer 30. This cyclic process of reading one fault bit out, per step signal, from the microcomputer through the adapter to the using system continues until all eight fault bits have been read to the using system.

After the using system has read the entire fault data word, it sends a device reset command to the command register 20. Decoder 28 decodes the device reset command and resets the interrupt system latch 58 and the fault mode latch 48.

With the fault mode reset in the adapter, the using system next loads a step count of one into register/counter 21 and loads a seek command into command register 20. Decode 28 generates the motor on signal and the seek signal from the seek command. Since fault mode latch 48 has been reset, AND gate 62 is enabled and allows the motor on signal to pass to microcomputer 30. The seek signal enables step clock 29, and the step clock passes the step signal to step latch 32 in the diskette drive.

The fault mode routine (FIG. 2) detects that a step signal has been received and that MTR ON is active. Therefore, the routine exits to a Power On Reset routine (POR). The diskette drive and adapter are now back in normal data mode operation, and the fault data has been transferred from the diskette drive to the using system.

While we have illustrated and described the preferred embodiments of our invention, it is understood that we do not limit ourselves to the precise constructions herein disclosed, and the right is reserved to all changes and modifications coming within the scope of the invention as defined in the appended claims.

What is claimed is:

1. Apparatus for transferring fault data from a recording device to a data processor connected to the device, said recording device having means responsive to the presence of first and second device-operation control signals on control lines from the processor to said device for controlling the operation of said device, and having a read output line for passing recorded data from said device to the processor, said transfer apparatus comprising:
   storage means in said recording device for storing the fault data;
   means in said recording device for generating a fault signal on the read output line;
   means in said processor responsive to the fault signal on the read output line for inhibiting said first control signal from the processor to said device; and
   control means in said recording device responsive to the absence of the first control signal for interpreting the second control signal as a data gating signal for outputting the fault data from said storage means to the read output line in response to said gating signal so that the fault data is passed to said processor.

2. The apparatus of claim 1 and in addition:
   means in said recording device for inhibiting passage of recorded data out on the read output line.

3. The apparatus of claim 2 wherein said control signal inhibiting means comprises:
   means for detecting whether read data or the fault signal is on the read output line and indicating a fault mode condition in the recording device when the fault signal is detected;
   means responsive to the fault mode condition for inhibiting the passage of the first control signal from said processor to said recording device.

4. The apparatus of claim 3 wherein:
   said storage means is a shift register;
   said second control signal is a step signal;
   said control means in response to the each step signal shifts a fault data bit out from said shift register to the read output line.

5. The apparatus of claim 1 wherein:
   said recording device is a disk drive;
   said first control signal is a motor on (MTR ON) signal and controls the on/off operation of the motor that rotates the recording disk;
   said second control signal is a step signal and controls a stepping motor to index the recording head from track to track on the recording disk.

6. The apparatus of claim 5 and in addition:
   means in said disk drive for inhibiting passage of recorded data signal out on the read output line;
   said generating means generating a fault signal whose pulse width is greater than the longest possible pulse width occuring in the recorded data signal and outputting the fault signal on the read output line.

7. The apparatus of claim 6 wherein said control signal inhibiting means comprises:
   pulse width detecting means for detecting the pulse width of the signal on the read output line and indicating a fault mode condition when the signal has a pulse width greater than the longest possible pulse width for the recorded data signal;
   means responsive to the fault mode condition for inhibiting the passage of the MTR ON signal from said processor to said recording device.

8. The apparatus of claim 7 wherein:
   said storage means is a register in the disk drive;
   said control means is enabled in the absence of the MTR ON signal to output a fault data bit from said register to the read output line each time said step signal is received.

9. The apparatus of claim 8 wherein:
   said register, said generating means and said control means are in a program controlled computer in the disk drive.

10. The apparatus of claim 9 and in addition:
    said computer disables the stepper motor and the drive motor when the fault signal is generated.

11. Method for passing error information from a peripheral device through an adapter to a using system, wherein the peripheral device interface contains operation control lines, and read and write data lines, said control lines carrying at least two control signals for controlling the operation of the peripheral device, said method comprising the steps of:
    generating a fault signal from the peripheral device on the read data line to the adapter;
    detecting in the adapter whether the signal on the read data line is recorded data or a fault signal;
    switching at least one of the adapter, the using system and the peripheral device to fault mode operation upon detection of the fault signal;
    inhibiting a first control signal from the system to the peripheral device during fault mode operation; and
    gating out the error information, from the peripheral device to the system through the adapter, on the read data line when a second control signal is received from the system while the first control signal is inhibited.

12. The method of claim 11 wherein said detecting step comprises the steps of:
   detecting the pulse width of the signal on the read data line;
   generating a fault mode signal if said pulse width is greater than a predetermined period.

13. The method of claim 12 and in addition:
   storing the peripheral device error information at said device until it can be passed to the using system.

14. The method of claim 13 wherein said error information is stored by said storing step as an error data bit word in an error information register, said second control signal is a step signal and said gating step comprises:
   checking whether said peripheral device has received the step signal;
   detecting whether said peripheral device has received the first control signal;
   outputting an error bit from the error information register each time the step signal is received if the first control signal has not been received at said peripheral device.

15. The method of claim 11 wherein said peripheral device is a disk drive, said first control signal is a motor on (MTR ON) signal to control the drive motor for the disk spindle and said second control signal is a step signal to control the indexing of the recording head to tracks on the recording disk during normal read/write operations and said error information is stored as an error data bit word in an error information register at said disk drive.

16. The method of claim 15 wherein said gating step comprises:
   detecting the absence of the MTR ON signal and the presence of the step signal;
   shifting one error bit of the error data word from the error information register onto the read data line each time the step signal is detected during the absence of the MTR ON signal.

17. The method of claim 16 wherein said switching and said inhibiting steps are performed in the adapter.

* * * * *